: 3,492,339
PREPARATION OF ACYLOXY-ALKANE CARBOXYLIC ACIDS
Edwin George Edward Hawkins, Lower Kingswood, Alfred Frank Millidge, Coulsdon, and Herbert Muggleton Stanley, Crediton, England, assignors to The Distillers Company Limited, Edinburgh, Scotland, a British company
No Drawing. Filed Aug. 3, 1966, Ser. No. 569,808
Claims priority, application Great Britain, Aug. 28, 1965, 37,095/65
Int. Cl. C07c 69/66, 59/04
U.S. Cl. 260—488    12 Claims

ABSTRACT OF THE DISCLOSURE

Acyloxyalkane carboxylic acids are produced by contacting a cyclic ketone with a secondary alcohol oxidate and contacting the resulting product with an aliphatic carboxylic acid.

---

This invention relates to the production of acyloxyalkane carboxylic acids.

According to the present invention the process for the production of acyloxyalkane carboxylic acids comprises a first step of contacting a cyclic ketone with a secondary alcohol oxidate, and a second step of contacting the resulting product with an aliphatic carboxylic acid.

It is preferred to use unsubstituted cyclic ketones such as cyclopentanone, cyclohexanone and cyclodecanone, in which case ω-acyloxyalkane carboxylic acids are produced. The preferred cyclic ketone is cyclohexanone.

The term "secondary alcohol oxidate" as used in this specification means a product of the oxidation of secondary alcohols containing active oxygen in the form of peroxides. Active oxygen is oxygen which reacts with acidified potassium iodide to yield iodine, each atom of active oxygen releasing two atoms of iodine. Thus in a peroxide each peroxy group which can be titrated with iodide is equivalent to one atom of active oxygen. The secondary alcohol oxidates may be obtained by the liquid phase oxidation of these alcohols with molecular oxygen by known techniques.

These oxidates are often mixtures of several peroxidic compounds containing active oxygen and not all of these compounds will individually give acyloxyalkane carboxylic acids by the process of the present invention, i.e. not all of the peroxides are reactive. It is believed that the proportion of reactive peroxides in the total peroxides in the secondary alcohol oxidate falls as the oxidation of the alcohol proceeds. The preferred method of producing the oxidate is by liquid phase oxidation of the secondary alcohol with molecular oxygen. This may be carried out at low pressures by irridating the alcohol with U.V. light while the oxygen is passed into it. Alternatively the oxidation may be carried out at higher pressures in the absence of U.V. light.

The oxidate of any secondary alcohol may be used but the oxidates of isopropanol and sec-butanol are preferred. Preferably the alcohol should have a boiling point such that the alcohol may be separated by distillation from any unreacted cyclic ketone left after the first reaction step.

The quantities of cyclic ketone and secondary alcohol oxidate brought into contact are preferably such that the ratio of moles of cyclic ketone to gram atoms of "active oxygen" is at least 1:1 and it is particularly preferred for the ratio to be at least 2:1.

The secondary alcohol oxidate and the cyclic ketone may be contacted by simply mixing them together. In view of the known instability of peroxides, reaction temperatures should be kept low to avoid loss of active oxygen. The reaction is preferably carried out under substantially neutral conditions. The presence of acid at this stage leads to lower subsequent yields of the acyloxycarboxylic acid.

After the secondary alcohol oxidate has been contacted with the cyclic ketone, the original secondary alcohol and the ketone corresponding to it are preferably removed by any suitable means e.g. by distillation. Distillation under reduced pressure may be used to minimise heating of the reaction mixture and consequent loss of active oxygen.

The product of the first step which, like the secondary alcohol oxidate contains active oxygen, is then contacted with the aliphatic carboxylic acid. This may be done by simple mixing of the reactants. It is preferred to use lower aliphatic carboxylic acids, for example acids of formula R—COOH where R=H or alkyl having 1 to 5 carbon atoms e.g. acetic acid and formic acid, and the use of formic acid is preferred.

The quantities of the product of the first step and carboxylic acid brought into contact are such that the ratio of gram atoms of "active oxygen" in the product of the first reaction step to moles of carboxylic acid is suitably greater than 1:1 and preferably from 5:1 to 12:1. The reaction is suitably carried out at temperatures up to about 100° C., i.e. 0° C. to 100° C. heating being continued until all the peroxidic compounds have decomposed.

Where the carboxylic acid is a weaker acid than formic acid then it is preferred to add a small quantity of a strong acid e.g. sulphuric, phosphoric or toluenesulphonic acid, as a catalyst.

After distilling off any excess carboxylic acid the acyloxy-carboxylic acid is distilled off, if necessary after removing any strong mineral acid present. This may be done, for example, by adding sodium acetate.

When the cyclic ketone is cyclohexanone and the carboxylic acid added in the second step is formic acid, the acyloxyalkane carboxylic acid produced is ω-formoxycaproic acid. ω-Formoxycaproic acid is a particularly valuable product because it reacts with ammonia to yield caprolactam, an intermediate in the manufacture of nylon-6.

The invention will now be further illustrated by the following examples.

EXAMPLE 1

Dry isopropanol (130 cc.) containing benzophenone (0.3 g.) was irradiated at about room temperature by a high-pressure mercury lamp as light source while oxygen was passed through the isopropanol. Further benzophenone (4 portions of 0.3 g. each) was added during the period for which the oxygen was passed which was 12½ hours. Periodically samples were taken and estimated for (i) active oxygen (by iodide) and (ii) potential hydrogen peroxide (by ceric ammonium sulphate); these figures were the same up to about 9 hours, but at the end of the reaction 0.146 g.:atom of "active oxygen" was present. Titration with ceric ammonium sulphate is believed to give an indication of the amount of "active oxygen" which will react in the process of the present invention and the quantity of such reactive peroxide was found to be equivalent to 0.107 mole of hydrogen peroxide on the basis that each peroxy group —O—O— reacting with ceric ammonium sulphate is equivalent to a molecule of hydrogen peroxide.

The oxidate was divided into two equal portions. One portion was mixed at room temperature with an equimolar amount of cyclohexanone in the presence of a small amount of hydrochloric acid. Low boiling material (mainly isopropanol and acetone) was removed on the water pump (ca. 15 mm. Hg.) at about room temperature.

The residue (11.2 g.) containing 0.0063 gram atom "active oxygen" after the removal of isopropanol and acetone was mixed with 98–100% formic acid (3.5 g.) and heated at 85°–90° C. for 1½ hours. The product on distillation gave formic acid, cyclohexanone, 6-formoxycaproic acid (6.7 g.) and residue (1.0 g.). Cyclohexanone (1.7 g.) was recovered from the lower boiling materials.

EXAMPLE 2

Half of the isopropanol oxidate (0.073 g. atom of active oxygen) of Example 1 was mixed at room temperature with cyclohexanone (14.6 g., i.e. 2 moles for every g. atom of active oxygen). After distillation of low-boiling materials as before the residue (16.2 g.) was found to contain 0.073 mole peroxide. This residue was treated with formic acid as in Example 1 and there were obtained ω - formoxycaproic acid (11.0 g.), cycloheanone (5.4 g.) and residue (0.6 g.).

EXAMPLE 3

Isopropanol (130 cc.) was oxidised as in Example 1 for 10 hours when it contained 0.1007 g. atom active oxygen. The quantity of peroxide found by titration with ceric ammonium sulphate was found to be equivalent to 0.0812 mole of potential hydrogen peroxide.

Half the oxidate was mixed with cycloheanone (7.85 g.; i.e. 1.6 moles for every g. atom of active oxygen) and subsequently treated as in Example 2 to give ω-formoxycaproic acid (6.3 g.), cyclohexanone (2.1 g.) and residue, (0.6 g.).

EXAMPLE 4

Half of the oxidate of Example 3 was mixed with cyclohexanone (5.9 g.; i.e. 1.2 moles for every g. atom of active oxygen) and subsequently treated as in Example 2 to give ω-formoxycaproic acid (5.6 g.), cyclohexanone (1.0 g.) and residue (0.6 g.).

EXAMPLE 5

Wet isopropanol, containing 11% by weight of water, and with the addition of 26 parts per millim of potassium pyrophosphate as stabilizer and 10% of its weight of the oxidate from a previous run as initiator, was oxidised with air at 120° and later 112° under 300 lbs./sq. inch pressure. The resultant oxidate (631 g.), contained 1.880 g. atoms of active oxygen. The quantity of peroxide found by estimation with ceric ammonium sulphate was found to be equivalent to 1.691 moles of hydrogen peroxide. The oxidate was mixed with cyclohexanone (748 g., 7.81 moles) at room temperature. Most of the isopropanol, acetone, and water was then removed from the mixture by passing it through a steam-heated film evaporator at 50 mm. pressure. The concentrate so obtained was diluted with a further 360 g. of cyclohexanone to redissolve some crystals which had started to form, and the whole was added to agitated formic acid (486 g.) at such a rate as to keep the reaction mixture at 100°. The reaction mixture was maintained for a further hour at 100° and then fractionally distilled. The fractions H.P. 120–206 of 11 mm. (106.5 g.) were submitted to analysis, which showed that they contained a total of 94.2 g. of ω-formoxycaproic acid and 10.2 g. of ω-caprolactone. This represents a yield of 63% of ω-formoxycaproic acid on the original active oxygen, plus an additional 10% of the useful by-product ω-caprolactone. The excess cyclohexanone and formic acid were recovered.

We claim:

1. A process for the production of acyloxyalkane carboxylic acids comprising a first step of contacting a cyclic ketone with a secondary alcohol oxidate selected from the group consisting of isopropanol oxidate and sec-butanol oxidate which contains active oxygen in the form of peroxides and is produced by oxidation of said alcohols and a second step of contacting the resulting product with an aliphatic carboxylic acid of the formula RCOOH wherein R is hydrogen or alkyl of 1 to 5 carbon atoms at a temperature of from 0° C. to 100° C.

2. A process according to claim 1 wherein the cyclic ketone is cyclohexanone.

3. A process according to claim 1 wherein the secondary alcohol oxidate is an oxidate of iso-propanol or sec-butanol.

4. A process according to claim 3 wherein the secondary alcohol oxidate and the cyclic ketone are brought into contact in the absence of acid.

5. A process according to claim 1 wherein R is alkyl of 1 to 5 carbon atoms and the second step is carried out in the presence of catalytic amounts of strong acids.

6. A process according to claim 5 wherein the strong acid is sulphuric or phosphoric acid.

7. A process according to claim 5 wherein the second step is carried out in the presence of between 0.5 and 10% by weight of strong mineral acid.

8. A process according to claim 1 wherein the quantities of secondary alcohol oxidate and cyclic ketone brought into contact are such that the ratio of moles of cyclic ketone to gram atoms of active oxygen is greater than 2 to 1.

9. A process according to claim 1 wherein in the second step the quantities of the product of the first step and carboxylic acid brought into contact with each other are such that the ratio of moles of carboxylic acid to g. atoms of oxygen is greater than 1:1.

10. A process according to claim 9 wherein the ratio of moles of carboxylic acid to gram atoms of active oxygen is greater than 5:1.

11. A process according to claim 1 wherein the cyclic ketone is cyclopentanone, cyclohexanone or cyclodecanone.

12. A process for the production of formoxycaproic acid which comprises a first step of contacting cyclohexanone with isopropanol oxidate containing active oxygen in the form of peroxides produced by oxidation of the secondary alcohol and a second step of contacting the resulting product with formic acid at a temperature of from 85° C. to 100° C.

References Cited

UNITED STATES PATENTS 3,234,212  2/1966  Winnick et al. _____ 260—239.3

FOREIGN PATENTS 1,368,139  6/1964  France.
1,395,969  3/1965  France.

OTHER REFERENCES

Brown, et al., Prep. of Cyclohexanone Peroxide, April 1955, vol. 77, J.A.C.S., pp. 1756–1759.

LORRAINE A. WEINBERGER, Primary Examiner

V. GARNER, Assistant Examiner